(12) United States Patent
Dillinger

(10) Patent No.: US 8,702,168 B2
(45) Date of Patent: Apr. 22, 2014

(54) HEAD RESTRAINT AND VEHICLE SEAT

(75) Inventor: Thomas Dillinger, Ratingen (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/496,589

(22) PCT Filed: Sep. 14, 2010

(86) PCT No.: PCT/EP2010/005619
§ 371 (c)(1),
(2), (4) Date: May 21, 2012

(87) PCT Pub. No.: WO2011/032678
PCT Pub. Date: Mar. 24, 2011

(65) Prior Publication Data
US 2012/0223552 A1 Sep. 6, 2012

(30) Foreign Application Priority Data

Sep. 16, 2009 (DE) .......................... 10 2009 041 429
Nov. 30, 2009 (DE) .......................... 10 2009 056 090
Sep. 2, 2010 (DE) .......................... 10 2010 044 248

(51) Int. Cl.
B60N 2/427 (2006.01)
(52) U.S. Cl.
USPC .................................................. 297/216.12
(58) Field of Classification Search
USPC ........................ 297/216.12, 216.13
See application file for complete search history.

(56) References Cited

U.S. PATENT DOCUMENTS

| 7,229,133 | B2* | 6/2007 | Maddelein et al. ....... 297/362.13 |
| 7,438,357 | B2* | 10/2008 | Becker et al. ............ 297/216.12 |
| 7,631,932 | B2* | 12/2009 | Hoffmann ................ 297/216.12 |
| 8,052,211 | B2* | 11/2011 | Nilakantan ............... 297/216.12 |
| 8,418,998 | B2* | 4/2013 | Okimura et al. .............. 267/124 |
| 2002/0043858 | A1 | 4/2002 | Svantesson et al. |
| 2009/0108645 | A1 | 4/2009 | Nilakantan |

FOREIGN PATENT DOCUMENTS

| DE | 39 00 495 A1 | 7/1990 |
| DE | 298 20 236 U1 | 4/1999 |
| DE | 29820236 | 4/1999 |
| DE | 10128651 | 12/2001 |
| DE | 202008009670 | 10/2008 |
| DE | 20 2008 009 670 U1 | 11/2008 |
| DE | 10 2008 011 325 A1 | 9/2009 |
| DE | 102008011325 | 9/2009 |
| JP | 09-254410 | 9/1997 |
| JP | 11-262426 | 9/1999 |
| JP | 2008275086 | 11/2008 |
| JP | 2009-036261 | 2/2009 |

OTHER PUBLICATIONS

German Exam Report mailed May 9, 2012.
International Search Report for application No. PCT/EP2010/005619 mailed Dec. 15, 2010.
Japanese Office Action mailed Sep. 29, 2013.

* cited by examiner

Primary Examiner — Sarah B McPartlin
(74) Attorney, Agent, or Firm — Fletcher Yoder P.C.

(57) ABSTRACT

A head restraint includes a contact surface movable toward and away from a seat occupant's head. The contact surface is connected to a fluid system that includes a piston rod. The fluid system adjusts the comfort and/or safety of the head contact surface. The fluid system comprises means for fixing the piston rod in a particular position in an accident situation.

16 Claims, 2 Drawing Sheets

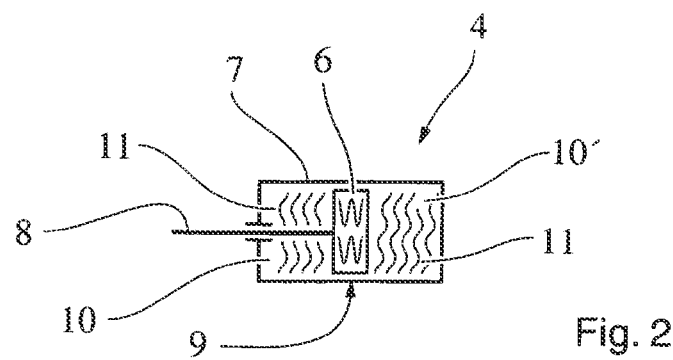
Fig. 2
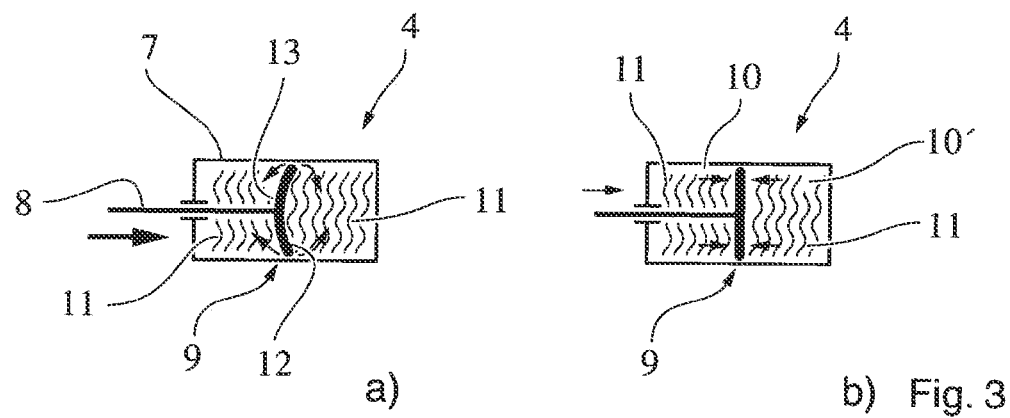
a)　　　　　　　　　　b)　Fig. 3
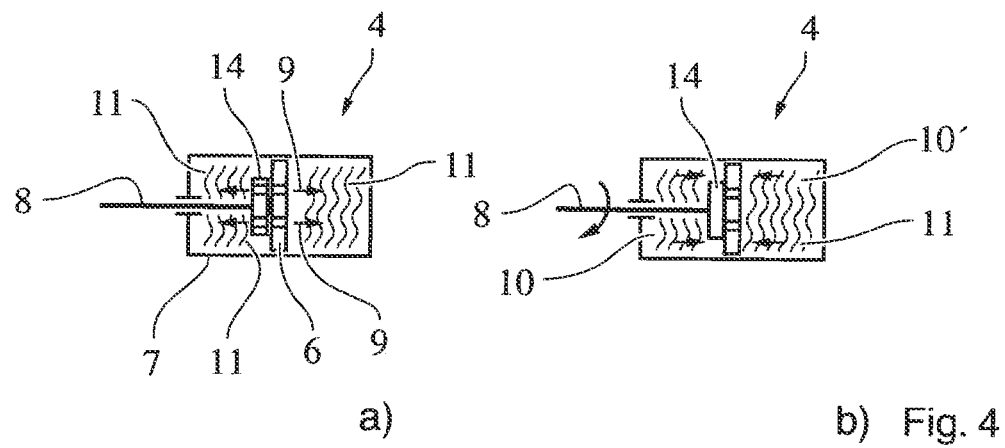
a)　　　　　　　　　　b)　Fig. 4

HEAD RESTRAINT AND VEHICLE SEAT

This application is a national phase of PCT Application No. PCT/EP2010/005619, filed on Sep. 14, 2010, entitled "Head Restraint and Vehicle Seat"; which claims priority to German Patent Application No. DE 10 2009 041 429.0, filed on Sep. 16, 2009, German Patent Application No. DE 10 2009 056 090.4, filed on Nov. 30, 2009, and German Patent Application No. DE 10 2010 044 248.8, filed on Sep. 2, 2010. Each of the foregoing applications is hereby incorporated by reference in its entirety.

BACKGROUND

The invention relates to a head restraint equipped with a fluid system and to a vehicle seat provided therewith.

It is known to adjust head restraints as a whole or parts thereof in the direction of travel (−X direction of the vehicle) or counter to the direction of travel (X direction of the vehicle) in order to set the head restraint cushion in an optimum position in respect of comfort and safety relative to the occupant's head. It is furthermore known from laid-open specification DE 39 00 495 A1 to shift the front cushion part of a head restraint in the −X direction into a safety position by means of a fluid drive in the event of a foreseeable accident.

SUMMARY

The invention is based on the object of providing a head restraint which can be set in a comfortable and simple manner in or counter to the direction of travel and to secure said head restraint against inadvertent adjustment upon impact thereagainst of the seat occupant's head. The intention by means of good energy management is in particular to reduce the risk of whiplash.

The object is achieved by a head restraint with a head contact surface which is movable toward and away from the seat occupant's head and is connected to a fluid system with a piston rod, wherein the fluid system preferably adjusts the comfort and/or safety of the head contact surface, and wherein said fluid system has a means which fixes the piston rod in the particular position thereof in an accident situation.

The present invention relates to a head restraint, in which the head contact surface is movable toward and away from the seat occupant's head for comfort and/or safety purposes. In the process, it is possible for the head restraint as a whole or only part thereof to be moved. This movement is preferably driven by a fluid system, for example a hydraulic or pneumatic system, with a piston rod. However, the head contact surface may also be adjusted manually by, for example, pulling or pushing thereon. In contrast to the prior art, the fluid system is not used to bring the head contact surface abruptly in the direction of the seat occupant's head in an accident situation. The fluid system brings about only a comparatively slow adjustment of the head contact surface carried out by the vehicle occupant so that the head restraint takes up the position optimum for the vehicle occupant in respect of comfort and/or safety, and/or said fluid system fixes the head contact surface in an accident situation.

The head restraint according to the invention is arranged on a vehicle seat according to the invention, in particular on the backrest thereof. A head restraint of this type is preferably provided so as to be height-adjustable and optionally also adjustable in angle in order to be able to be adapted to the height of the particular seat occupant.

The vehicle seat according to the invention may provide space for one or more individuals. Consequently, the vehicle seat according to the invention may also be a seat bench.

According to the invention, provision is now made for the fluid system preferably to bring about the adjustment of the comfort of the head contact surface, i.e. the head contact surface can be automatically moved by means of the fluid system in the direction of the seat occupant and away from the latter in order to increase the comfort and/or safety of said seat occupant, and/or said fluid system fixes the head contact surface in an accident situation. In contrast to the prior art, the fluid system is therefore not used to bring the head contact surface abruptly in the direction of the seat occupant's head in an accident situation.

According to the invention, furthermore, the fluid system of the head restraint according to the invention has a means which fixes the piston rod in the particular position thereof in an accident situation. Fixed within the context of the invention means that, in the event of an accident, the head contact surface is moved only so slightly that the risk of whiplash is at least reduced and is preferably prevented. The means ensures that the fluid system is highly rigid. Consequently, the head restraint according to the invention has the advantage that no further system is required in addition to the fluid system for the at least substantial fixing of the head contact surface.

The fluid system preferably has a first and a second fluid reservoir, a fluid flowing from the first into the second fluid reservoir during the adjustment of the comfort of the head contact surface.

Furthermore preferably, the fluid system has a means which, in the event of an accident situation, at least reduces, in particular prevents, the fluid exchange between the first and the second fluid reservoir. In the event of only a reduction in the fluid exchange being provided, said fluid exchange has to be small enough for the head contact surface to be moved only to such a minimum extent that there is no risk of whiplash.

According to a first embodiment, the means is a gap between the piston and the cylinder wall of the fluid system. This gap connects the first and the second fluid reservoir. In order to adjust the comfort, the fluid flows through said gap. In the event that, however, an abrupt load is exerted on the piston, as occurs, for example, in the event of an accident, said gap is configured to be so narrow that only a very small fluid exchange, if any at all, takes place between the first and the second reservoir, and therefore the fluid system is of overall very stiff design.

According to a further preferred embodiment of the present invention, the means is a flexible disk which is connected to the piston rod. Said flexible disk is arranged in the cylinder of the fluid system. Between the flexible disk and the cylinder wall there is a gap which connects the first and the second fluid reservoirs to each other. In an accident situation, the flexible disk is then deformed in such a manner that said gap is at least partially closed, and therefore only a very small fluid exchange, if any at all, takes place between the two reservoirs. As a result, the piston rod cannot move into the cylinder or out of the latter, and the fluid system is as a whole very stiff.

The disk preferably has a conical cross section, wherein, particularly preferably, the piston rod is provided in the tip of the cone.

According to a further preferred embodiment of the present invention, the means is a valve which automatically closes in an accident situation. The valve is preferably a disk which, in an accident situation, closes openings which are present and through which fluid can be exchanged between the first and the second reservoir. In an accident situation, the disk preferably rotates and thereby closes flow ducts which are present.

DRAWINGS

The invention is explained below with reference to FIGS. 1-4. These explanations are merely by way of example and do not restrict the general inventive concept.

FIG. 2 shows a first fluid system according to the invention;

FIG. 3 shows a second fluid system according to the invention in an adjustment position (FIG. 3a) and in a blocking position (FIG. 3b);

FIG. 4 shows a third fluid system according to the invention in an adjustment position (FIG. 4a) and in a blocking position (FIG. 4b).

DETAILED DESCRIPTION

Figure 1:
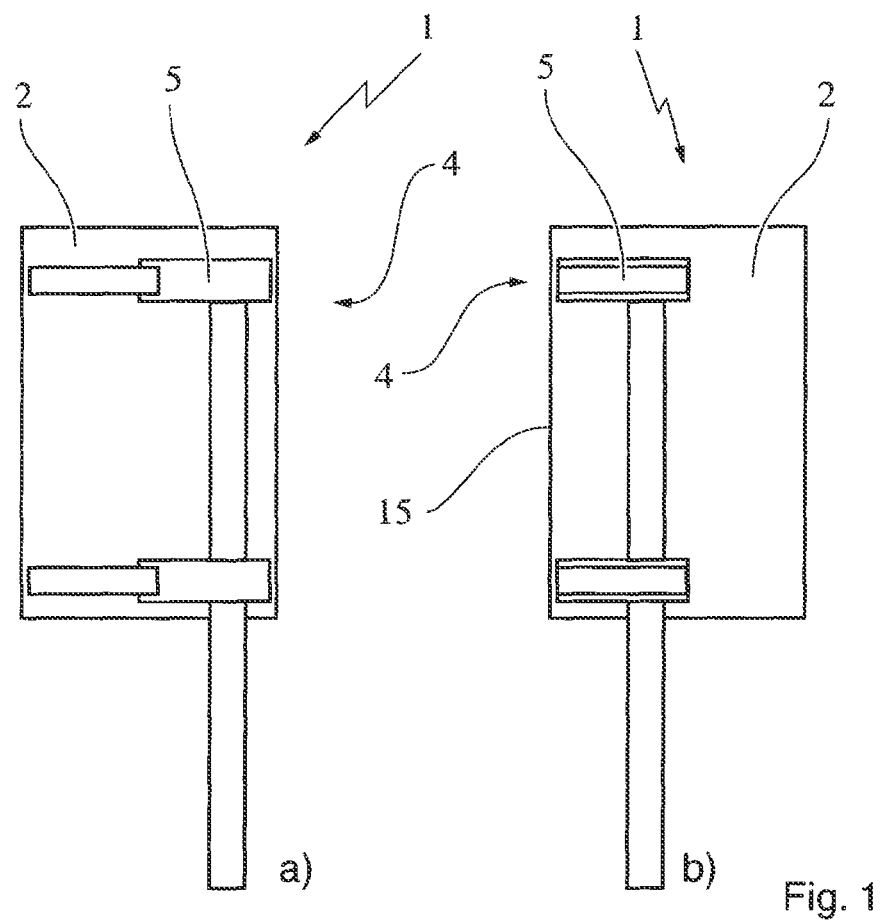
FIG. 1 shows a head restraint according to the invention in a first use position (FIG. 1a) and a second use position (FIG. 1b)

The head restraint 1 shown in FIG. 1 consists of a cushion part 2 and of holding rods 3 which are fastened to the backrest and are operatively connected by means of a fluid system 4 in the form of a fluid drive 5. In the exemplary embodiment, setting of a rear use position (FIG. 1b), a front use position (FIG. 1a) and arbitrary use positions located in between is provided, wherein the cushion part 2 is shifted relative to the holding rods 3. In principle, adjustment of the head restraint 1 as a whole relative to the backrest or else adjustment of a front cushion segment relative to a rear cushion element would also be conceivable. A person skilled in the art recognizes that, in particular, the head contact surface 15 of the head restraint has to be movable toward and away from the seat occupant's head.

The fluid system 4 according to FIG. 2 consists of a cylinder 7 connected to the holding rods 3 and a piston 6, the piston rod 8 of which acts on the cushion part 2 and on the head contact surface 15. The space in the cylinder 7 is filled on both sides of the piston 6 with a fluid 11 which can flow through a narrow fluid path 9 between the relevant fluid reservoirs 10, 10' of the cylinder 7. Owing to the viscosity, this flow is only slowly possible, and therefore the comfort and/or safety can be adjusted manually by the user. In the event of a sudden loading, for example the striking of the head against the cushion part 2, this system behaves relatively stiffly as a fluid damper and, by prescribing the viscosity and/or the flow cross section, permits energy management which can easily be influenced. The fluid system 4 can serve at the same time as a fluid drive 5 by fluid 11 being fed into or let out of the chambers 10, 10' and the associated displacement of the piston 6 relative to the cylinder 7. However, the drive may also take place in some other manner, for example by an electric drive which is connected in series with the fluid system 4 and acts directly or indirectly, for example, on the piston rod 8.

FIG. 3 shows a further embodiment of the head restraint according to the invention, wherein reference is made to the explanations with regard to FIGS. 1 and 2. In the development according to FIG. 3, the piston 6 is designed in the form of an elastic disk 12 which is in the shape of a blunted cone and the surface area of which is spaced apart from the cylinder 7 in order to form a fluid path 9. The space in the cylinder 7 is filled on both sides of the disk 12 by a fluid 11 which can flow through a narrow fluid path 9 between the relevant fluid reservoirs 10, 10' of the cylinder 6. Owing to the viscosity, this flow is only slowly possible, and therefore the comfort and/or safety can be adjusted manually by the user. The tip 13 of the conical elastic disk faces counter to the anticipated impact loading, i.e. in the direction of the seat occupant's head. If said impact loading occurs, the disk 12 is flattened, as a result of which the diameter thereof is increased and, by reducing/blocking the fluid path 9 and/or by the effect of friction, acts counter to a displacement of the piston 6 relative to the cylinder 7. The fluid system 4 can serve at the same time as a fluid drive 5 by fluid 11 being fed into or let out of the chambers 10, 10' and the associated displacement of the disk 12 relative to the cylinder 7. However, the drive may also take place in some other way, for example by an electric drive which is connected in series with the fluid system 4 and acts directly or indirectly, for example, on the piston rod 8.

FIG. 4 shows a further embodiment of the head restraint according to the invention, wherein reference is made to the explanations with regard to FIGS. 1 and 2. The fluid system 4 according to FIG. 4 has a piston 6 which is provided with bores 13, wherein the piston rod 8 is equipped with a coaxially arranged disk 14 which is likewise provided with bores 13'. With relatively little application of force, a slow displacement of the piston 6 relative to the cylinder 7 is possible as long as the bores 13, 13' overlap in order to form fluid paths 10. In the process, the fluid 11 flows through the bores 13, 13'. However, upon an impact load, the disk 14 is, for example, rotated about the axis of symmetry thereof in such a manner that the bores 13, 13' are no longer aligned and the fluid path 9 is interrupted or is reduced in cross section. The rotation can be transmitted, for example, from the piston rod 8 to the disk 14, wherein the piston rod 8, for its part, is operatively connected to the cushion part 2 and the head contact surface 15 via a gearing device which produces said rotation in the event of a load. However, the blocking may also take place, for example, manually. The disk 14 acts here as a valve. The fluid system 4 can serve at the same time as a fluid drive 5 by fluid 11 being fed into or let out of the chambers 10, 10' and the associated displacement of the piston 6 relative to the cylinder 7. However, the drive may also take place in some other manner, for example, by an electric drive which is connected in series with the fluid system 4 and acts directly or indirectly, for example, on the piston rod 8.

LIST OF REFERENCE SYMBOLS 1 head restraint
2 cushion part
3 holding rod
4 fluid system
5 fluid drive
6 piston
7 cylinder, cylinder wall
8 piston rod
9 fluid path
10, 10' fluid reservoir, chamber
11 fluid
12 disk
13, 13' recess, bore
14 valve, disk
15 head contact surface

The invention claimed is:

1. A head restraint comprising a head contact surface movable toward and away from a seat occupant head and connected to a piston rod of a fluid system, wherein the fluid system is configured to adjust a position of the head contact surface, and wherein the fluid system comprises a flow blocking system configured to substantially fix the position of the head contact surface in an accident situation;

wherein the fluid system comprises a piston coupled to the piston rod, a first fluid reservoir on a first side of the piston, and a second fluid reservoir on a second side of the piston, opposite the first side;

wherein the fluid system is configured to adjust the position of the head contact surface by transferring fluid between the first and second reservoirs.

2. The head restraint as claimed in claim 1, wherein the flow blocking system is configured to reduce fluid exchange between the first and second fluid reservoirs in the accident situation.

3. The head restraint as claimed in claim 2, wherein the flow blocking system comprises a gap between the piston and a cylinder wall.

4. The head restraint as claimed in claim 2, wherein the flow blocking system comprises a flexible disk connected to the piston rod.

5. The head restraint as claimed in claim 4, wherein the disk has a conical cross section.

6. The head restraint as claimed in claim 1, wherein the flow blocking system comprises a valve.

7. The head restraint as claimed in claim 6, wherein the valve comprises a disk.

8. A vehicle seat having a head restraint as claimed in claim 1.

9. A head restraint comprising a head contact surface movable toward and away from a seat occupant head and connected to a piston rod of a fluid system, wherein the fluid system is configured to facilitate adjustment of a position of the head contact surface;

wherein the fluid system comprises a piston coupled to the piston rod, a first fluid reservoir on a first side of the piston, and a second fluid reservoir on a second side of the piston, opposite the first side;

wherein the fluid system comprises a flow blocking system configured to reduce movement of the head contact surface by reducing fluid exchange between the first and second fluid reservoirs in response to an impact on the head contact surface.

10. The head restraint as claimed in claim 9, wherein the flow blocking system comprises a gap between the piston and a cylinder wall.

11. The head restraint as claimed in claim 9, wherein the flow blocking system comprises a flexible disk connected to the piston rod.

12. The head restraint as claimed in claim 11, wherein the disk has a conical cross section.

13. The head restraint as claimed in claim 9, wherein the flow blocking system comprises a valve.

14. The head restraint as claimed in claim 13, wherein the valve comprises a disk.

15. The head restraint as claimed in claim 9, wherein the flow blocking system is configured to substantially fix the position of the head contact surface in response to the impact.

16. The head restraint as claimed in claim 9, wherein the flow blocking system is configured to absorb energy from the impact by damping the fluid exchange.

\* \* \* \* \*